United States Patent
Annadata et al.

(10) Patent No.: US 7,313,798 B2
(45) Date of Patent: Dec. 25, 2007

(54) AGGREGATE DRIVERS FOR A CONFIGURABLE MEDIA-INDEPENDENT SERVER

(75) Inventors: Anil Kumar Annadata, Milpitas, CA (US); Mingte Chen, Fremont, CA (US); Kuang-Yang Huang, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 440 days.

(21) Appl. No.: 10/001,157

(22) Filed: Nov. 15, 2001

(65) Prior Publication Data
US 2007/0192771 A1    Aug. 16, 2007

(51) Int. Cl.
*G06F 3/00*    (2006.01)
(52) U.S. Cl. ...................................... 719/321
(58) Field of Classification Search ................ 719/310, 719/321–327
See application file for complete search history.

(56) References Cited
U.S. PATENT DOCUMENTS

| | | | | |
|---|---|---|---|---|
| 5,745,761 A | * | 4/1998 | Celi et al. .................... | 719/323 |
| 5,890,014 A | * | 3/1999 | Long .............................. | 710/8 |
| 5,918,021 A | * | 6/1999 | Aditya ....................... | 709/235 |
| 6,067,576 A | * | 5/2000 | Berranger et al. .......... | 719/321 |
| 6,088,361 A | * | 7/2000 | Hughes et al. .............. | 370/439 |
| 6,226,011 B1 | * | 5/2001 | Sakuyama et al. .......... | 345/600 |
| 6,671,743 B1 | * | 12/2003 | Verity ........................ | 719/321 |
| 6,901,453 B1 | * | 5/2005 | Pritchett et al. ............ | 709/250 |

* cited by examiner

*Primary Examiner*—William Thomson
(74) *Attorney, Agent, or Firm*—Campbell Stephenson LLP

(57) ABSTRACT

One or more third party channel drivers interface with a centralized communication application server. An aggregate channel driver (ACD) is included in a channel driver to implement commands and command parameters that are supported by a particular core channel driver (CCD), but not by the communication server. The ACD can also implement events and event parameters that are supported by a particular communication server, but not by the CCD. A customer can thus include the ACD to extend and/or overwrite the functionality of a channel driver without rewriting or modifying the CCD.

16 Claims, 23 Drawing Sheets

FIG. 2a: CNCTR, Communication Channel Driver Table

| Column Name | Type | Length | Comments |
|---|---|---|---|
| CNCTR_ID | Varchar | 15 | Identifier for channel driver channel driver CNCTR. CNCTR refers to software *connector*. |
| NAME | Varchar | 75 | Name of channel driver. |
| MEDIA_TYPE | Varchar | 50 | Media type. The value of this column can be expanded by customer. |
| LIB_NAME | Varchar | 250 | File name of channel driver DLL |
| INBOUND_FLG | Char | 1 | To indicate whether this channel driver supports inbound communications |
| OUTBOUND_FLG | Char | 1 | To indicate whether this channel driver supports outbound communications |
| CNCTR_MEDIA_STR | Varchar | 100 | The media string defined by the driver vendor, which will be used at run time to invoke the media service for the channel driver. |
| DESC_TEXT | Varchar | 250 | Comments |
| UQ_DRIVER_FLAG | Char | 1 | To indicate whether this channel driver is Universal Queuing type of channel driver |

FIG. 2b: CNCTR_PARM, Channel Driver Parameter Table

| Column Name | Type | Length | Comments |
|---|---|---|---|
| CNCTR_PARM_ID | Varchar | 15 | Identifier for channel driver parameter |
| NAME | Varchar | 75 | Name of channel driver parameter |
| DFLT_VALUE | Varchar | 250 | Default value of channel driver parameter |
| CNCTR_ID | Varchar | 15 | |
| REQUIRED_FLG | Char | 1 | To indicate whether this parameter must have a value at runtime |

FIG. 2c: PROF, Communication Channel Driver Profile Table

| Column Name | Type | Length | Comments |
|---|---|---|---|
| PROF_ID | Varchar | 15 | Identifier for channel driver profile |
| NAME | Varchar | 75 | Name of channel driver profile |
| CNCTR_ID | Varchar | 15 | |

FIG. 2d: PROF_PARM, Communication Channel Driver Profile Parameter Table

| Column Name | Type | Length | Comments |
|---|---|---|---|
| PROF_PARM_ID | Varchar | 15 | Identifier for channel driver profile parameter |
| PROF_ID | Varchar | 15 | Channel Driver Profile ID |
| CNCTR_PARM_ID | Varchar | 15 | Parameter name ID |
| VALUE | Varchar | 250 | Override value of channel driver profile parameter. |

FIG. 2e: AGENT_PREF, Agent Preference Table

| Column Name | Type | Length | Comments |
|---|---|---|---|
| AGENT_PREF_ID | Varchar | 15 | Identifier for agent preference |
| EMP_ID | Varchar | 15 | |
| SETTING_NAME | Varchar | 75 | Preference name |
| SETTING_VALUE | Varchar | 250 | Preference value |
| SETTING_TYPE | Varchar | 50 | Preference type, e.g., "CTI" or "Communication" |

FIG. 2f: AGENT_STAT, Agent Status Table.

| Column Name | Type | Length | Comments |
|---|---|---|---|
| AGENT_STAT_ID | Varchar | 15 | Identifier for agent status |
| EMP_ID | Varchar | 15 | Employee ID |
| PROF_ID | Varchar | 15 | The channel driver profile ID. Agent has different status for different types of channel driver profiles. |
| NOT_READY_FLG | Char | 1 | Is agent not ready? |
| BUSY_FLG | Char | 1 | Is agent busy? |

FIG. 2g: MEDIA_STAT, Communication Media Status Table.

| Column Name | Type | Length | Comments |
|---|---|---|---|
| MEDIA_STAT_ID | Varchar | 15 | Identifier for media status |
| EMP_ID | Varchar | 15 | Employee ID |
| PROF_ID | Varchar | 15 | The channel driver profile ID of the channel driver profile to which the status corresponds. |
| MEDIA_OBJECT_STR | Varchar | 250 | The string to represent the media object (e.g. the agent's extension number, or the sender's address of an email) |
| WORKING_SINCE_DT | Date Time | 7 | Work item starting time |
| WORK_ITEM_STR | Varchar | 250 | Work item ID |

FIG. 2h: TELESET, Teleset Table.

| Column Name | Type | Length | Comments |
|---|---|---|---|
| TELESET_ID | Varchar | 15 | Identifier for teleset |
| NAME | Varchar | 30 | Teleset Name |
| HOSTNAME | Varchar | 70 | Hostname of the computer connected to the Teleset. |
| COMMENTS | Varchar | 250 | |

FIG. 2i: EXTENSION, Extension Table.

| Column Name | Type | Length | Comments |
|---|---|---|---|
| EXTENSION_ID | Varchar | 15 | Identifier for extension |
| TELESET_ID | Varchar | 15 | Teleset ID |
| DN_EXT | Varchar | 15 | Extension Information |
| EXT_ACD_QUE | Varchar | 30 | This is the ACD queue to which this extension belongs. |
| EXT_TYPE | Varchar | 30 | ACD Extension or standard extension |
| AUTO_LOGIN_FLAG | Char | 1 | Indicate if we need to login to ACD for this extension at startup. |

FIG. 2j: AGENT, Communication Agent Table.

| Column Name | Type | Length | Comments |
|---|---|---|---|
| AGENT_ID | Varchar | 15 | Identifier for agent |
| PR_CFG_ID | Varchar | 15 | The primary configuration the agent uses. |
| EMP_ID | Varchar | 15 | Employee ID |
| ACTIVE_CFG_ID | Varchar | 15 | The currently active configuration. |
| ACTIVE_TELESET_ID | Varchar | 15 | The Teleset that the agent is currently using. |

FIG. 2k: AGENT_TELSET, Communication Agent-Teleset Table

| Column Name | Type | Length | Comments |
|---|---|---|---|
| AGENT_TELSET_ID | Varchar | 15 | Identifier for agent/teleset relationship |
| AGENT_ID | Varchar | 15 | Agent ID |
| TELESET_ID | Varchar | 15 | Teleset ID |

FIG. 2l: AGENT_QUE, Agent-Queue Table.

| Column Name | Type | Length | Comments |
|---|---|---|---|
| AGENT_QUE_ID | Varchar | 15 | Identifier for agent/queue relationship |
| AGENT_ID | Varchar | 15 | Agent ID |
| ACD_QUEUE_NAME | Varchar | 30 | ACD Queue |
| AUTO_LOGIN_FLAG | Char | 1 | Indicates need to login to ACD for this extension at startup. |

FIG. 2m: AGENT_LIM, Communication Agent Limitation Table.

| Column Name | Type | Length | Comments |
|---|---|---|---|
| AGENT_LIM_ID | Varchar | 15 | Identifier for agent limitation |
| AGENT_ID | Varchar | 15 | Agent ID |
| PROF_ID | Varchar | 15 | Channel Driver Profile ID that agent cannot use. |

FIG. 2n: CFG, Communication Configuration Table.

| Column Name | Type | Length | Comments |
|---|---|---|---|
| CFG_ID | Varchar | 15 | Identifier for configuration |
| NAME | Varchar | 30 | Configuration name |
| INGRP_FLAG | Char | 1 | To indicate whether this configuration is for inbound response group used in inbound communication receiver. |
| COMMENTS | Varchar | 250 | |

FIG. 2o: CFG_PROF, Communication Configuration Channel Driver Profile Table

| Column Name | Type | Length | Comments |
|---|---|---|---|
| CFG_PROF_ID | Varchar | 15 | Configuration/channel driver profile relationship |
| CFG_ID | Varchar | 15 | Configuration ID |
| PROF_ID | Varchar | 15 | Channel Driver Profile ID |

FIG. 2p: AGENT_CFG, Communication Agent - Configuration Table

| Column Name | Type | Length | Comments |
|---|---|---|---|
| AGENT_CFG_ID | Varchar | 15 | Identifier for agent/configuration relationship |
| AGENT_ID | Varchar | 15 | Agent ID |
| CFG_ID | Varchar | 15 | Configuration ID |

FIG. 2q: CFG_PARM, Communication Configuration Parameter Table.

| Column Name | Type | Length | Comments |
|---|---|---|---|
| CFG_PARM_ID | Varchar | 15 | Identifier for configuration parameterand |
| CFG_ID | Varchar | 15 | Configuration ID |
| NAME | Varchar | 50 | Parameter Name |
| VALUE | Varchar | 50 | Parameter Value |
| ACTIVE_FLG | Char | 1 | Active flag is set if the value is valid |

FIG. 2r: CMD, Communication Command Table

| Column Name | Type | Length | Comments |
|---|---|---|---|
| CMD_ID | Varchar | 15 | Identifier for command |
| CFG_ID | Varchar | 15 | Configuration ID |
| NAME | Varchar | 70 | Command name |
| TYPE | Varchar | 50 | Command type |
| PROF_ID | Varchar | 15 | The channel driver profile ID for the channel driver profile that this command is targeting. |

FIG. 2s: CMD_PARM, Communication Command Parameter Table

| Column Name | Type | Length | Comments |
|---|---|---|---|
| CMD_PARM_ID | Varchar | 15 | Identifier for command parameter |
| CMD_ID | Varchar | 15 | Command ID |
| PARAM_NAME | Varchar | 100 | Command parameter name |
| PARAM_VALUE | Varchar | 100 | Command parameter value |

FIG. 2t: CMD_DATA, Communication Command Data Table

| Column Name | Type | Length | Comments |
|---|---|---|---|
| CMD_DATA_ID | Varchar | 15 | Identifier for command data |
| CFG_ID | Varchar | 15 | Command ID |
| NAME | Varchar | 100 | Command parameter name |
| Comment | Varchar | 200 | Comment (optional) |

FIG. 2u: CMD_DATA_PARAM, Communication Command Data Parameter Table

| Column Name | Type | Length | Comments |
|---|---|---|---|
| CMD_DATA_PARAM_ID | Varchar | 15 | Identifier for command data parameter |
| CMD_DATA_ID | Varchar | 15 | Identifier for command data |
| PARAM_NAME | Varchar | 100 | Command parameter name |
| PARAM_VALUE | Varchar | 200 | |

FIG. 2v: CMD_GROUP, Communication Command Group Table

| Column Name | Type | Length | Comments |
|---|---|---|---|
| CMD_GROUP_ID | Varchar | 15 | Identifier for group of commands |
| SUB_CMD_ID | Varchar | 15 | Foreign key to command table |
| ORDER | Number | 10 | Default "0" |

FIG. 2w: EVTHDLR, Communication Event Handler Table

| Column Name | Type | Length | Comments |
|---|---|---|---|
| EVTHDLR_ID | Varchar | 15 | Identifier for event handler |
| PROF_ID | Varchar | 15 | The channel driver profile ID for the channel driver profile from which this event originated. |
| NAME | Varchar | 100 | Event name |
| MEDIA_EVENT | Varchar | 100 | Identifier for event |
| ORDER | Number | 10 | Default "0" |
| EVT_RESP_ID | Varchar | 15 | Foreign key to event response table |
| Comment | Varchar | 200 | Comment (optional) |

FIG. 2x: HDLR_PARM, Communication Event Handler Parameter Table

| Column Name | Type | Length | Comments |
|---|---|---|---|
| HDLR_PARM_ID | Varchar | 15 | Identifier for event handler response |
| EVT_HDLR_ID | Varchar | 15 | Identifier for event handler |
| PARAM_NAME | Varchar | 100 | Event parameter name |
| PARAM_VALUE | Varchar | 200 | Event parameter value |

FIG. 2y: EVTRESP, Communication Event Response Table

| Column Name | Type | Length | Comments |
|---|---|---|---|
| EVTRESP_ID | Varchar | 15 | Identifier for event response |
| CFG_ID | Varchar | 15 | Identifier for configuration |
| NAME | Varchar | 100 | Event parameter name |
| COMMENT | Varchar | 200 | Comment (optional) |

FIG. 2z: EVTRESP_PARM, Communication Event Response Parameter Table

| Column Name | Type | Length | Comments |
|---|---|---|---|
| RESP_PARM_ID | Varchar | 15 | Identifier for event response parameter |
| EVTRESP_ID | Varchar | 15 | Identifier for event response |
| PARAM_NAME | Varchar | 100 | Event response parameter name |
| PARAM_VALUE | Varchar | 200 | Event response parameter value |

FIG. 2aa: EVTLOG, Communication Event Log Table

| Column Name | Type | Length | Comments |
|---|---|---|---|
| EVTLOG_ID | Varchar | 15 | Identifier for event log |
| CFG_ID | Varchar | 15 | Foreign key for configuration table |
| NAME | Varchar | 100 | Event parameter name |
| COMMENT | Varchar | 200 | Comment (optional) |

FIG. 2bb: LOG_PARM, Communication Event Log Parameter Table

| Column Name | Type | Length | Comments |
|---|---|---|---|
| LOG_PARM_ID | Varchar | 15 | Identifier for event log parameter |
| EVTLOG_ID | Varchar | 15 | Identifier for event log |
| PARAM_NAME | Varchar | 100 | Event log parameter name |
| PARAM_VALUE | Varchar | 200 | Event log parameter value |

FIG. 2cc: EVTRESP_LOG Event Response – Event Log Table

| Column Name | Type | Length | Comments |
|---|---|---|---|
| RESP_LOG_ID | Varchar | 15 | Identifier for response log |
| EVTRESP_ID | Varchar | 15 | Identifier for event response |
| EVTLOG_ID | Varchar | 15 | Identifier for event log |
| LOG_TYPE | Varchar | 100 | Type of EventLog declaration specified in EventResponse definition. |

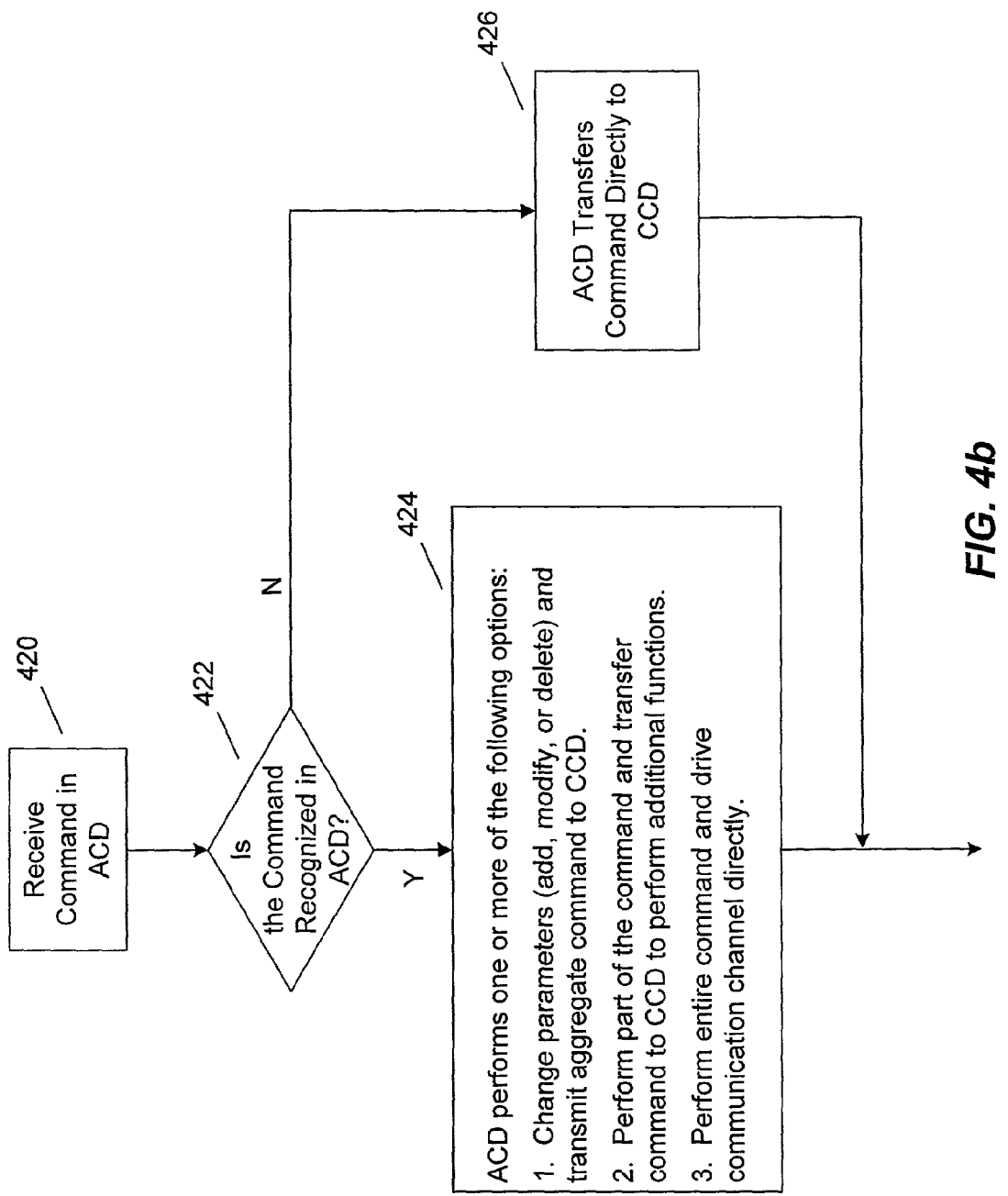

AGGREGATE DRIVERS FOR A CONFIGURABLE MEDIA-INDEPENDENT SERVER

BACKGROUND OF THE INVENTION

In today's emerging technological and information world, companies are interacting with their customers, potential customers and other contacts through a wide variety of different communication channels. Such communication channels include face-to-face, telephone, fax, email, voicemails, wireless communication, Internet information inquiries via call me now and call me later, Internet collaborative sessions, paging and short messaging services. With all these communication channels, companies are faced with managing each customer interaction while meeting service levels and maximizing customer satisfaction. In addition, companies are faced with optimally staffing and training their workforce to deal with customers through these communication channels whether through their customer support center(s), telebusiness organizations, or their sales, marketing, and service professionals.

Currently, many companies have dedicated email inboxes, fax inboxes, and voicemail boxes defined for specific business areas as well as automated call distributors. Employees called agents are assigned to poll and manage the support requests from customers for each communication channel. Combined with the traditional call queues for inbound telephone calls, each agent is tasked with managing his or her work using all these communication channels while not having any visibility to the queue status and priorities of each customer support request and/or communication channel.

Most communication software is designed to work with a single communication device or type of communication channel. If a company wishes to implement a customer support center where agents can communicate using multiple communication channels of different media types, typically the company must purchase different software products to handle each media type because of the different communication protocols involved. For example, normally an email server is sold separately from software that can receive data via wireless access protocol.

Further, several third party vendors supply a range of different software products to perform similar functions. A centralized communication server capable of servicing multiple communication channels of different media types for several different customers can be provided, as set forth, for example, in U.S. patent application Ser. No. 09/823,835 (attorney docket M-11529 US, client reference SIEB063/US), entitled "Multi-Channel Media Independent Server." Such a communication server can recognize a core group of commands and events from the customers' channel drivers, however, some customers may wish to add new commands or take advantage of extended command functions in their existing drivers.

Therefore, it is desirable to provide a system that allows customers to increase and extend the functionality of existing drivers.

SUMMARY

One or more third party channel drivers interface with a centralized communication application server. An aggregate channel driver (ACD) is included in a channel driver to implement commands and command parameters that are supported by a particular core channel driver (CCD), but not by the communication server. The ACD can also implement events and event parameters that are supported by a particular communication server, but not by the CCD. A customer can thus include the ACD to extend and/or overwrite the functionality of a channel driver without rewriting or modifying the CCD.

In one embodiment, an ACD receives a command from an communication server, determines, based on the command, whether to extend functions performed by a CCD, and transfers the command to the core communication channel driver. The ACD can modify a list of parameters associated with the command before transferring the command to the CCD. The ACD can also perform one or more extended functions associated with the command before transferring the command to the CCD. The result of the functions can be transmitted directly to the communication server without transferring the command to the CCD.

The ACD can also receive an event from the CCD, determine, based on the event, whether to modify a list of parameters associated with the event or perform one or more functions associated with the event before transmitting the event to the communication server.

The methods in accordance with the present invention can be embodied in the form of computer-implemented processes and apparatuses for practicing those processes. The methods can also be embodied in the form of computer program code embodied in tangible media, such as floppy diskettes, CD-ROMS, hard drives, or any other computer-readable storage medium where, when the computer program code is loaded into and executed by a computer, the computer becomes an apparatus for practicing the invention. The method can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

FIGS. 2a through 2cc show examples of tables corresponding to table names in FIG. 2.

FIG. 4b shows a flow diagram of an example of logic that can be included in the aggregate channel driver to extend the functionality of a core channel driver to handle commands from a communication server.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
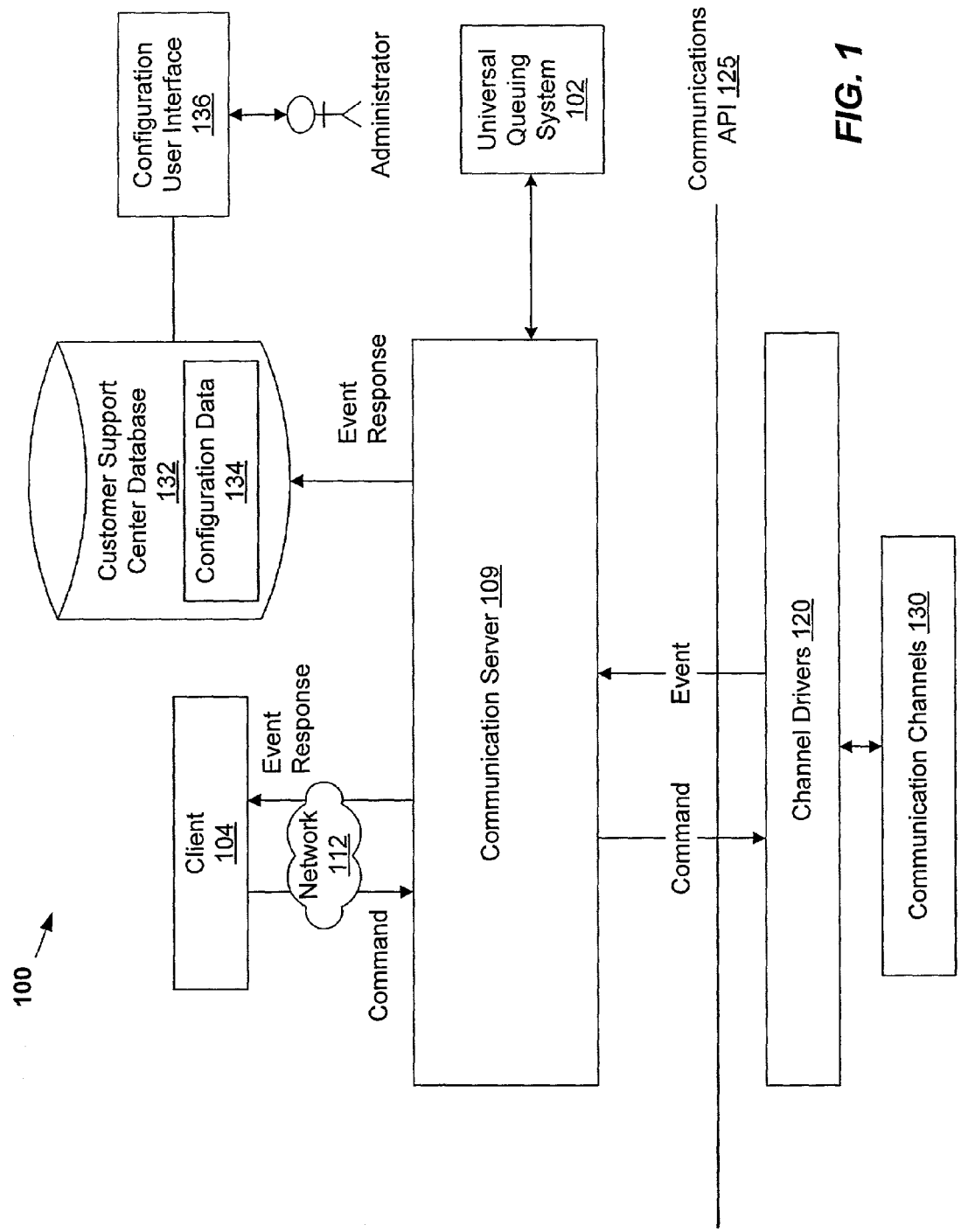
FIG. 1 is a block diagram of an example of a communication system with which an aggregate driver in accordance with the present invention can be utilized.

FIG. 1 is a block diagram of an example of a communication system 100 with which an aggregate driver in accordance with the present invention can be utilized. Communication system 100 enables agents to respond to customer support requests and/or information requests via multiple communication channels of different media types. These media types include, but are not limited to, telephone, email, fax, web collaboration, Internet call me now and call me later, web chat, wireless access protocol, paging, and short messaging services. The term customer is used herein to include individuals and contact persons at businesses that are customers of the company, potential customers and other persons with whom a customer support agent communicates.

Communication system 100 includes a universal queuing (UQ) system 102 capable of assigning, routing, and queuing work items from multiple channels of communication to an agent having the appropriate skills to respond to a customer support request. The term work item refers to a request from a customer that requires a response from an agent assigned by communication system 100, such as responding to a customer support request in the form of a telephone call, email, fax or other communication of a different media type. A work item can be initiated when an event such as an incoming customer support request arrives or by an agent using a user interface to communication system 100.

Communication system 100 also includes a communication server 109 that enables agents to use communication channels of different media types to communicate with customers. Communication server 109 handles events such as the arrival of incoming customer support requests from channel drivers 120. Each channel driver 120 communicates with a communication channel 130.

Interaction between UQ system 102 and communication server 109 occurs when, for example, communication server 109 receives and routes an incoming customer request as a work item to UQ system 102 for assignment to an agent via a client 104. UQ system 102 assigns an agent to the work item and sends the work item back to communication server 109 for communication to the assigned agent. Client 104 can include a web browser program such as Microsoft's Internet Explorer or other user interface program that can be implemented with a computer system connected to communication server 109 via a communication network (not shown).

Communication server 109 handles all communication between agents and customers via communication channels 130 of one or more media types. Communication server 109 is not media-specific and has no knowledge of communication channels or media.

Multiple communication channels 130 of different media types each have a corresponding channel driver 120 that interfaces with communication server 109 via a communication application program interface (API) 125. Communication API 125 translates commands and events in channel drivers 120 to commands and events recognized by the communication server 109. Events provide information regarding activity of a specific communication channel 130.

Communications API 125 enables communications server 109 to operate independently of the media type of the communication channels 130 and specific protocols to communicate with communication devices. Customers are thus able to use a variety of different communication channels 130 and channel drivers 120 while taking advantage of centralized customer support center management features and multi-media communication channel capabilities of communication server 109.

Figure 2:
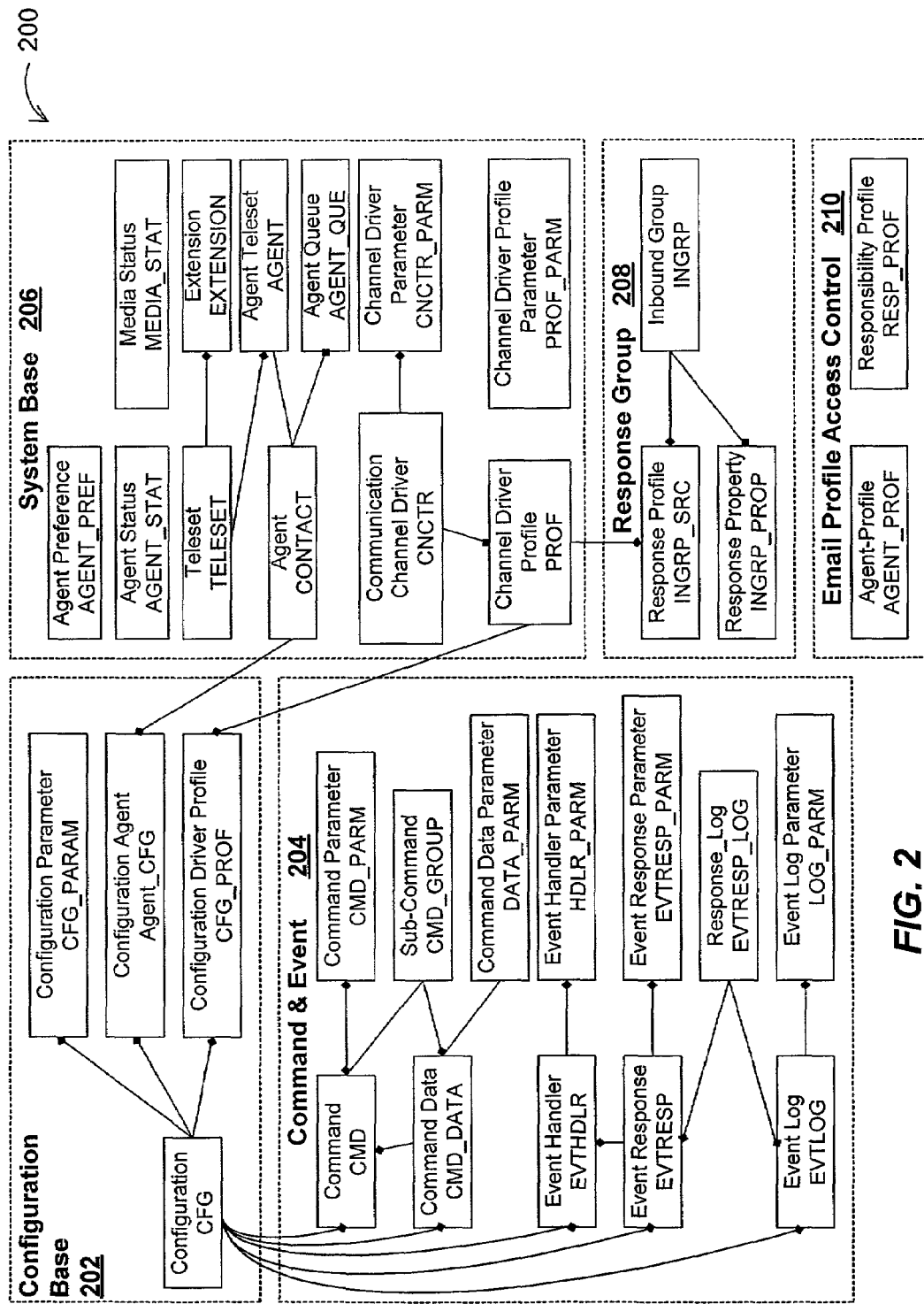
FIG. 2 shows an example of a database schema for the communication server of FIG. 1.

Referring to FIG. 2, an example of a database schema 200 that can be used by communication system 100 (FIG. 1) for storing and communicating channel driver information, agent limitations on media access, commands and events, inbound task management, agent preferences, agent status, media status, communication channel configurations, multiple queue support, and agent management is shown. Database schema 200 includes data structures for configuration base 202, command and event 204, system base 206, response group 208, and email profile access control 210.

FIGS. 2a through 2cc show examples of tables corresponding to table names in FIG. 2. Note that FIG. 2 does not indicate all of the relationships between the tables for simplicity, and that many instances of a table may exist for a particular configuration, depending on the number and types of communication channels authorized. Additionally, one skilled in the art will realize that this collection of tables, the parameters included in each table, and the storage space allowed for the parameters, is one example of how the database schema may be configured, and that other suitable arrangements can be utilized. FIGS. 2a through 2cc are further described in the U.S. patent application Ser. No. 09/823,835 (attorney docket M-11529 US, client reference SIEB063/US), filed Mar. 31, 2001, entitled "Multi-Channel Media Independent Server" and naming Minute Chen, Anil K. Annadata, and Leon Chan as inventors, the application being incorporated herein by reference in its entirety.

The command and event data structure 204, includes information describing commands and events implemented by channel drivers 120. This information includes associating each command and each event with a channel driver 120.

CMD table (FIG. 2r) includes commands for each channel driver 120. As described above, a vendor providing a channel driver 120 specifies the commands that it supports. Commands are invoked by agents via a user interface implemented in the client 104. A command is issued to channel driver 120 by communications server 109 to perform a command using communication channel 130.

A command can have a command data section with a CmdData keyword to specify the data parameter in order to communicate with channel driver 120. A command can have a group of associated commands which operate as subcommands. A group command includes other commands with a Subcommand keyword.

When a customer support center configuration includes multiple channel drivers 120, it is then possible for communication server 109 to determine which commands and events are handled by each of the channel drivers 120. This configuration can also help distinguish between channel drivers 120 from different vendors that use the same name for commands performing different functions.

Following is an example of a command with a data section having a CmdData keyword

```
[Command: MakeCalltoContact]
    CmdData =                           "MakeCalltoContact"
    DeviceCommand =                     "MakeCall"
    Description =                       "Make Call to Contact"
    Hidden =                            TRUE
    [CmdData: MakeCalltoContact]
        BusComp =                       "Contact"
        RequiredField.'Work Phone #'=   "?*"
        Param.PhoneNumber =             "{Work Phone # : Lookup}"
```

The event table contains events that are sent to communication server 109 from channel drivers 120. Vendors specify the events that will be sent in channel driver 120. An event response determines how communication server 109 reacts upon receiving each media event. The process of handling an event includes searching for the event handler for the event, querying a customer support center database 132 to determine the appropriate event response, and logging the event.

An example of an event, the event handler, event response, and event log for an InboundCall event are shown below:

```
[EventHandler:OnInboundCall]                                              first stage, EventHandler definition
    DeviceEvent =           "EventRinging"                                media event definition
    Response =              "OnInsideCallReceived"                        EventResponse declaration
    Filter.Call =           "?*"                                          EventHandler parameter
    Order =                 "1"                                           EventHandler order
[EventResponse:OnInboundCallReceived]                                     second stage, EventResponse
definition
    QueryBusObj =           "Contact"                                     EventResponse parameter
    QueryBusComp =          "Contact"
    QuerySpec =             "'Work Phone #'='{ANI}'"
    SingleView =            "Service Contact Detail View"
    MultiView =             "Contact List View"
    FindDialog =            "Service Request"
    FindField.CSN =         "Ask Caller"
    FindLog =               "LogIncomingCallContactNotFound"    EventLog declaration
    SingleLog =             "LogIncomingCallContactFound"       EventLog declaration
    Log =                   "LogIncomingCallContactNotFound"    EventLog declaration
[EventLog:LogIncomingCallContactFound]                          β EventLog definition
    Display =               "TRUE"                              β EventLog parameters
    BusObj =                "Action"
    BusComp =               "Action"
    LogField.Type =         "Call - Inbound"
    LogField.'AccountId'=               "{Contact.'Account Id'}"
    LogField.'Contact Id'=              "{Contact.Id}"
    LogField.Description =              "Inbound call"
    LogField.'Call Id'=                 "{ConnID}"
    AfterCall.'ACD Call Duration'= "{@CallDuration}"
```

Each event handler corresponds to an event provided by one of the channel drivers 120 and includes an event response. An event response can be shared among event handlers. An event response can have multiple event logs, and an event log can be shared among event responses.

Communication server 109 receives incoming events such as customer support requests and communicates interactively with the agent by controlling a user interface presented to the agent. When an event such as the arrival of an incoming telephone call occurs, the user interface notifies the agent. When the agent accepts the telephone call, puts a call on hold, or releases a call, the agent sends a command to the communication server 109 via the user interface. The communication server 109 issues the command to the channel driver 120 associated with the communication channel 130 for the telephone call.

When the agent performs an activity using the client 104 that requires a command to be executed, the communication server 109 searches command tables in the configuration data 134, and collects the data associated with that command. The communication server then determines which of channel drivers 120 performs the command requested by the client 104, and passes the command and data to the channel driver 120 for execution via the communications API 125.

Figure 3:
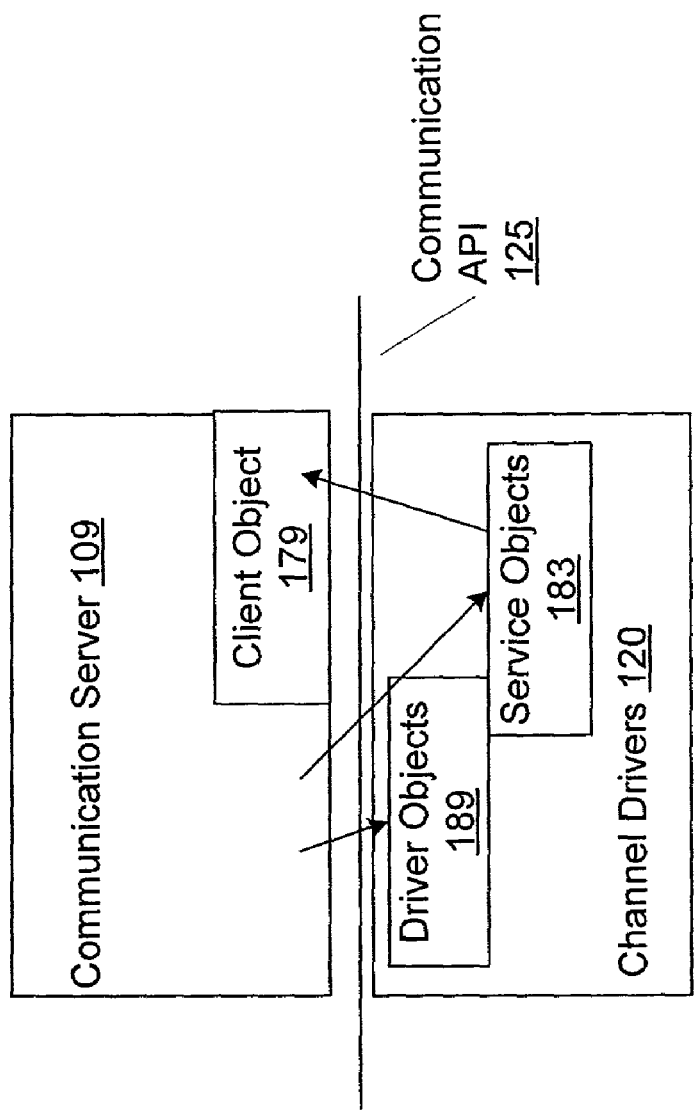
FIG. 3 shows a block diagram of one embodiment of components included in a channel driver that can be utilized to implement an aggregate driver in accordance with the present invention.

Referring now to FIGS. 1 and 3, one embodiment of communication API 125 includes interaction between three types of objects: driver objects 189, service objects 183, and client objects 183. Driver objects 189 and service objects 183 are instantiated at the channel drivers 120, while client objects 179 are instantiated at communication server 109. Communication server 109 interfaces with driver objects 189 and service objects 183, but only service objects 183 communicate with client objects 179.

Driver objects 189 maintain the instantiation of service objects 183. Any special steps for constructing and destructing service objects 183 can be implemented in driver objects 189. Multiple driver objects 189 can be included to manage different types of media. Also, a single driver object 189 can manage one type of service objects 183 or different types of service objects 183. For example, a single driver object 189 can manage phone, email and fax media.

Communication server 109 interfaces directly with service objects 183 to invoke device commands to interact with the associated media type via the communication channels 130. Communication server 109 obtains an identifier, also referred to as a "handle", of the desired channel driver 120 for the media type from the configuration data 134 and issues a RequestService( ) function to request a service object 183 for the specified media type. The driver object 183 returns the identifier of the service object 183 to the communication server 109. Communication server 109 then uses this identifier in an InvokeCommand( ) function to send commands to the service object 183.

Client objects 179 are instantiated and implemented by communication server 109. An identifier for the client object 179 is passed to the service object 183. Service objects 183 can utilize the identifier for the client object 179 when sending an event to invoke a function to be executed at communication server 109.

In one embodiment, every service object 183 has a corresponding client object 179. Therefore, each client object 179 has knowledge of the media type that its corresponding service object 183 is using. Since service objects 183 can each be instantiated for different media from different driver dynamic link libraries (DLLs), this one-to-one relationship allows a client object 179 to know the driver object 189 and service object 183 that initiate the notification when client object 179 receives notification from service object 183.

Channel driver 120 monitors communication channel 130 for communication activity. The service objects 183 implement the functionality for communicating with one or more communication channel 130 such as the handshaking and protocol(s) to send commands to and receive events from the hardware devices and/or software elements of communication channel 130.

The communication server 109 listens to web browser client 104 for commands and the channel driver object 189 or server object 183 listens for events indicating activity on communication channel 130.

Communication server 109 determines a channel driver 120 to issue commands by using the command name received from the client 104 to query customer support center database 132. The command table CMD (FIG. 2r), the channel driver table CNCTR (FIG. 2a), and the configuration table CFG (FIG. 2n) are examples of tables that can be used by the communication server 109 to determine the channel driver 120 associated with the command. Communication server 109 obtains the parameters for the command from a command parameter table such as CMD_PARM (FIG. 2s) and uses the service object 183 to provide the command and the parameters to channel driver 120. Channel driver 120 issues the command to the communication channel 130.

When an event from channel driver 120 is received, communication server 109 determines the channel driver 120 for the communication channel 130 that originated the event by querying customer support center database 132. Tables such as channel driver table CNCTR (FIG. 2a), event table EVT (FIG. 2t), and configuration table CFG (FIG. 2n) are among the tables used to identify the channel driver 120.

Having identified the channel driver 120 responsible for originating the event, the communication server 109 determines an event response to be made. The event response may be in the form of a data window presented on a user interface at the client 104, for example. Other types of event responses include presentation of a scripted dialogue of questions for the agent to ask the customer, running a software program to perform an operation, invoking UQ system 106, and creating a database record in customer support center database 132. An event response corresponds to an event. Event responses are configurable by an administrator using configuration user interface 136 and are stored in an event response table such as EVTRESP (FIG. 2y). Session mode communication server 110 also logs the event response for tracking purposes in an event log table such as EVT_LOG (FIG. 2aa).

Communications server 109 uses configuration data 134 from customer support center database 132 to control the presentation of information to the agent via the client 104. For instance, the appearance of the user interface presented by the client 104 is determined according to configuration data 134. The buttons that appear, the commands that are invoked when an agent clicks each button, and the response triggered by an incoming event are all specified as part of configuration data 134 by an administrator using configuration user interface 136.

The following provide examples of runtime status flags that can be used in communication API 125:

| | |
|---|---|
| NOTSUPPORTED = 1; | Command is not supported |
| DISABLED = 2; | Command is disabled at this time |
| CHECKED = 4; | Command is in "checked" state, for example when agent is in busy mode the "busy" command will be "checked" |
| BLINKING = 8; | This is special effect flag to enable the blinking "answer call" command |
| NOPARAMSOK = 16; | Command does not require any parameters to execute |
| STRPARAMSOK = 32; | Command can be executed by providing single unnamed string parameters. Such commands are invoked when the agent types something in the edit control of the communication toolbar 105 and clicks the corresponding button. |

The following provide examples of commands that can be used in one embodiment of communication API 125:

MediaType: The MediaType command is used from channel drivers 120 to provide the media type associated with the communication channel 130. An indicator of the media type, such as the following examples of media type strings, is passed to the channel driver 120 in the CreateDriverInstance( ) function:

| | |
|---|---|
| PHONECONTROL = | 1 |
| CALLROUTING = | 2 |
| EMAIL = | 3 |
| FAX = | 4 |
| WEBCALL = | 5 |
| WEBCHAT = | 6 |

CommandTypeEx: Channel driver 120 uses the CommandTypeEx function to request different services, such as making calls and sending messages, from communication server 109.

ObjectType: The ObjectType function is used to monitor the communication objects, which can be represented by the following parameter values:

| | |
|---|---|
| OB_LINK = | 1 |
| SWITCH = | 2 |
| QUEUE = | 3 |
| TELESET = | 4 |
| DN = | 5 |
| AGENT = | 6 |
| CALL = | 7 |
| CALLROUT = | 8 |
| EMAIL = | 9 |
| FAX = | 10 |
| WEBCALL = | 11 |

-continued

| | |
|---|---|
| WEBCHAT = | 12 |
| OTHERS = | 1000 |

ObjectProperty: The function ObjectProperty can be used to provide properties of monitored communication objects, such as:

| | |
|---|---|
| ONOFF = | 1 |
| AGENTID = | 2 |
| NOTREADY = | 4 |
| BUSY = | 5 |
| DESCRIPTION = | 7 |
| TIMEINQUEUE = | 9 |
| QUEUEID = | 12 |
| ISLOGON = | 13 |

Channel Driver Object Functions

In one embodiment, the driver objects 189 within each of the channel drivers 120 can include the following functions:

FreeStrParamList is invoked by communications server 109 to release the memory which is initially allocated by the channel drivers 120.

RequestMediaTypeList is invoked by communications server 109 to query the list of media type strings supported by the channel drivers 120. It can include the parameter mediaTypeList, which is a list of media-type strings.

RequestCommandEventList is invoked to generate lists of commands and events that are implemented for a particular media type supported by a particular channel driver 120. The parameters can include an input parameter specifying the media type, and output parameters that include lists of the commands and events.

CreateDriverInstance is invoked to create a channel driver 120. The following parameters can be used:
mediaTypeStr: the media-string that is defined by a particular driver implementation.
languageCode: the language string, e.g. "ENU" for English, "FRA" for French, "DEU" for German, "PTB" for Portuguese-Brazilian, "ESN" for Spanish, "ITA" for Italian, and "JPN" for Japanese.
connectString: the connect string for the channel driver 120
datasetParams: the parameter list collected from the configuration data 134
handle: an identifier of the channel driver 120 returned to the communication server 109

RequestService requests a service object 183 from the driver object 189. The following parameters can be used:
clntInterface: the interface at the client object 179
connectString: the connect string for the service object 183
datasetParams: the parameter list collected from the configuration data 134
serviceHandle: the handle to the service object 183 returned by the driver object 189

ReleaseDriverInstance is invoked by the communication server 109 to release the driver object 189 specified by the driver handle supplied as a parameter.

Service Object Functions

In one embodiment, service objects 183 within each of the channel drivers 120 can include the following functions:

ReleaseServiceInstance is invoked to release the service object 183.

NotifyEventHandlingFinished is invoked by communications server 109 to notify the driver object 189 that the event handling is complete and the driver object 189 can move on or continue the process. This function is invoked to respond to HandleEvent's notifyWhenDone parameter. The following parameters can be used:
Handle: identifier of the service object 183.
trackingID: an identifier for the work item for which the communications server 109 was doing event handling.
result: the result of event handling query of the list of media type strings supported by the channel driver 120.

InvokeCommand is invoked by communications server 109 to invoke a driver command. The following parameter list can be used:
Handle: identifier of the service object
clntCmdTrackID: the unique ID for the InvokeCommand request
name: the command name to invoke
stringParam: the string from "Phone #" edit box on the toolbar 105
datasetParam: the parameter list collected based on the configuration InvokeCommandEx is invoked by communications server 109 to invoke a certain type of command. The following parameter list can be used:
Handle: identifier of the service object.
clntCmdTrackID: the unique ID decided by the communication server 109 for this InvokeCommand request.
commandType: the type of command the communications server 109 wants to execute.
datasetParam: the predefined parameter list set by the communications server 109.

ReleaseWorkItem is invoked by communication server 109 to request release of a work item. Parameters can include:
Handle: identifier of the service object.
TrackingID: identifier of the work item.

SuspendWorkItem is invoked by communication server 109 to request the service object 183 to suspend a work item. Parameters can include:
Handle: identifier of the service object 183.
TrackingID: identifier of the work item.

ResumeWorkItem is invoked by communication server 109 to request the service object 183 to resume a work item. Parameters can include:
Handle: identifier of the service object 183.
TrackingID: identifier of the work item.

HandleQueuedEvent is invoked by communication server 109 to pass an event previously queued in UQ system 102 to the service object 183 for handling. The channel driver 120 can treat this as an incoming media event from the middleware server. Parameters can include:
Handle: identifier of the service object.
name: the event name (from the original HandleEvent ( ) call).

fields: the event attributes list (from the original HandleEvent ( ) call).

trackingID: the unique ID for the media item.

CancelQueuedEvent is invoked by communication server 109 to notify the channel driver 120 that a media-event is cancelled, released, or transferred by UQ system 102. This function is the companion function of HandleQueuedEvent( ). The following parameters can be used:

Handle: identifier of the service object.

name: the event name (from the original Handle Event( ) call).

trackingID: the unique ID for the media item.

Client Object Functions

The following are examples of functions that can be included in Client Objects 179. The interface to these functions can be implemented with a function pointer to a dynamic link library (DLL) so that driver objects 189 do not need to link to any libraries in communication server 109.

ReleaseClientInstance causes driver object 189 to release a client object's handle.

BeginBatch and Endbatch are designed to save network overhead. The client object functions called between BeginBatch and EndBatch can be cached and sent out at the EndBatch call. These two functions can be used at the discretion of the driver object 189. For example,

```
BeginBatch_Helper(clientInterface);
        CacheCommandInformation_Helper(clientInterface, . . .);
            <-- cached
    ; ; ; ; // some processing
    if (error)
        HandleError_Helper(clientInterface, . . .); <-- cached
    HandleEvent_Helper(clientInterface, . . .); <-- cached
    EndBatch_Helper(clientInterface); <-- All requests will be
    sent out in
            one request
*/
```

HandleEvent is used to handle the named event received from the channel driver 120, using the given fields. By calling this method, the service object 183 notifies the client objects 179 of the event, such as a call coming in on the monitored teleset. The following is the parameter list:

Handle: identifier of the service object 183.

name: the event name.

fields: event attributes list.

notifyWhenDone: When set to TRUE, client objects 179 will invoke notifyEventHandlingFinished( ) to notify the service object 183 as soon as the event handling is done.

trackingID: the ID uniquely identifies the work item that this event is associated with, e.g. call ID, email ID or web-chat session ID.

ShowStatusText displays textual status information in the status line of the client objects 179. The following parameter list can be used:

Handle: identifier of the service object 183.

text: the text to display at a user interface associated with the client 104.

HandleError handles asynchronous errors and logs them to an error log file. The following parameters can be used:

Handle: identifier of the service object 183.

clntCmdTrackID: if not 0, it is the same "clntCmdTrackID" value passed to InvokeCommand( ) to reflect the error caused by the request in InvokeCommand( ). If it is 0, the error occurs out of context.

error: the error text.

CacheCommandInformation is used to notify the client objects 179 about command status caching. The following parameters can be used:

commandNames: list of command names.

commandDescriptions: list of description text for each command.

commandStatuses: list of status (CommandFlag) for each command.

UpdateObjectInformation is used to notify the client objects 179 about status change of objects. The following parameters can be used:

trackingID: the ID uniquely identify the call that causes this information update.

objectType: enumerated ObjectType value.
objectID: the unique ID for this object. For phone, it is the extension. For email, it is the mailbox. For fax, it is the fax number.
datasetInfo: the list of ObjectProperty values to update. For example, the list { {"4", "TRUE"}, {"9", "33"} } indicates ISNOTREADY is TRUE and TIMEINQUEUE is 33 seconds.

IndicateNewWorkItem notifies client objects 179 about the arrival of a new inbound work item (e.g. call, email or fax) if the channel driver 120 supports a facility to change the work item's ID. The following parameters can be used:

trackingID: the unique identifier (ID) to identify the new work item.

oldTrackingID: ID to identify the old ID.

WorkItemStarted notifies client objects 179 that the agent has started working on one particular work item. This happens when (1) the agent answers a call and the call is connected, or (2) the agent accepts an email/fax work item. In response, client object 179 sets the work item identified by "trackingID" as the active work item and starts tracking this work item. The agent will be treated as talking or working. The start time of this work item can be recorded by client objects 179. The following parameters can be used:

trackingID: the unique ID to identify this work item.
oldTrackingID:    See the comment of the function IndicateNewWorkItem( ).
objectType: the object type.
objectID: the media object for this work item. For phone, it is the
    extension. For email, it is the mail box.
description: the description of work item.
Driver implementation can use
    UpdateObjectInformation to change the description of work item.
startTime: the time the work item is started.

WorkItemReleased is used to notify client objects 179 that a particular work item is released. This happens when (1) the agent releases a call and the call is disconnected, or (2) the agent completes an email/fax work item. In response, client objects 179 stop tracking this work item and remove this work item. The following parameters can be used:

trackingID: the unique ID to identify the work item that is being released.

stopTime: the time the work item is released/stopped.

CleanAllWorkItems notifies client objects 179 that all work items stored in client objects 179 should be removed.

WorkItemSuspended notifies client objects 179 that a work item is suspended. This can happen, for example, when (1) the agent puts a call to hold, or (2) the agent suspends an email/fax work item. The driver implementation calls this function when suspension is done. In response, client objects 179 save the working context for this particular work item. The parameter trackingID can be used to identify the work item WorkItemResumed notifies client objects 179 that a suspended work item is resumed. This can happen, for example, when (1) the agent unholds a call and the call is retrieved, or (2) the agent resumes an email/fax work item. The service objects 183 call this function when restoring is complete. In response, client objects 179 restore the working context at the client 104 and set the active work item as the one identified by "trackingID". The parameter trackingID can be used to identify the work item.

Note that other functions such as AcceptWorkItem and TransferWorkItem, and other parameters can be included in communication API 125 instead of, or in addition to, the functions listed herein.

Further, since third parties can supply the channel drivers 120, there are likely to be occasions when the communication server 109 is capable of responding to more events than the third party implemented in a particular channel driver 120. Likewise, the communication server 109 may support more parameters for particular events than a channel driver 120 provides.

Similarly, the channel driver 120 may be capable of responding to more commands than are implemented in the communication server 109. Still further, the channel driver 120 may support more parameters for particular commands than the communication server 109 provides.

Figure 4:
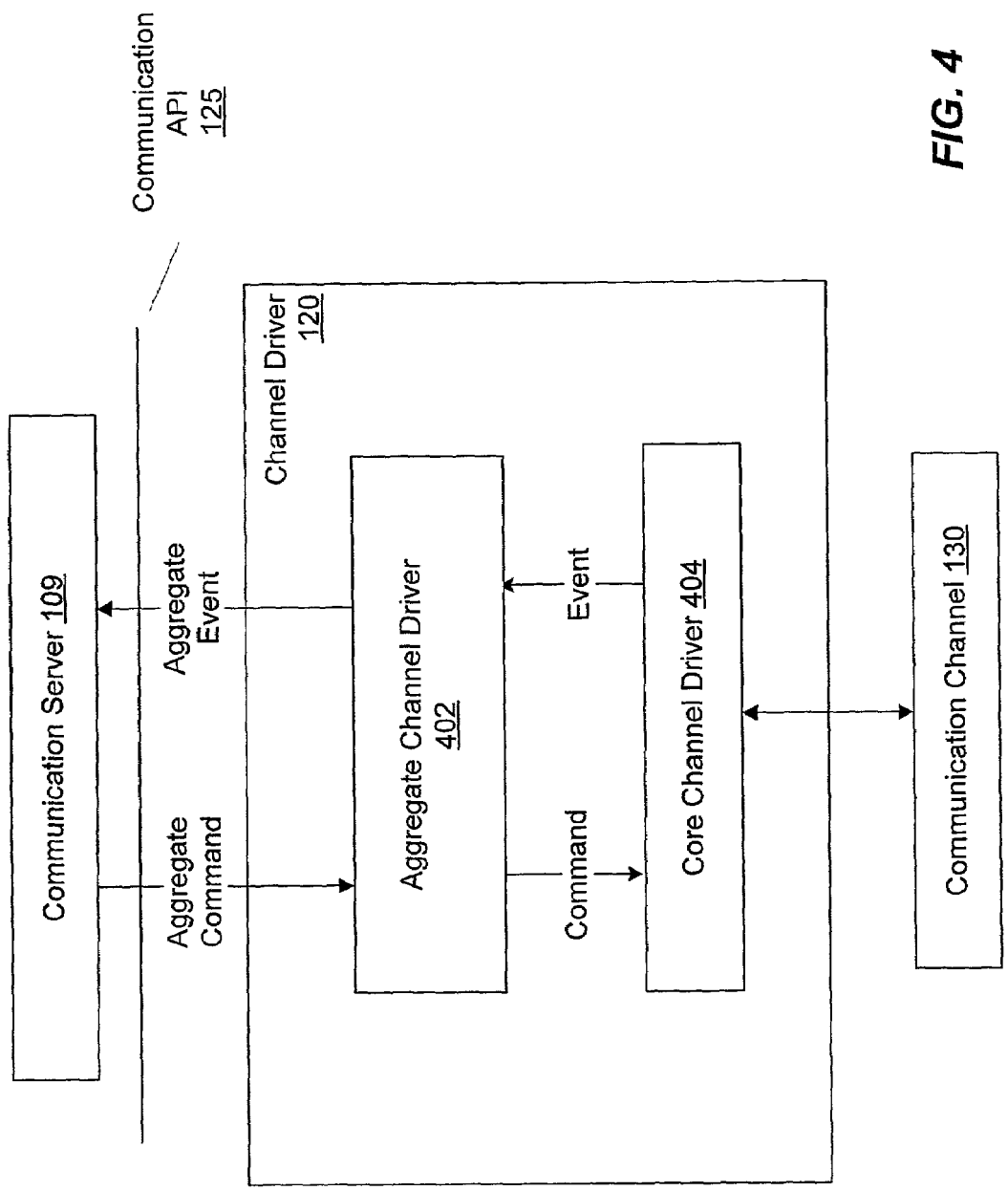
FIG. 4 shows a block diagram of an aggregate channel driver (ACD) 402 in accordance with the present invention that can be included in the channel driver of FIG. 1.

Referring now to FIG. 4, an aggregate channel driver (ACD) 402 in accordance with the present invention can be included in the channel driver 120 to implement commands and command parameters that are supported by a particular core channel driver (CCD) 404, but not by the communication server 109. The ACD 402 can also implement events and event parameters that are supported by a particular communication server 109, but not by the CCD 404. A customer can thus include the ACD 402 to extend the functionality of the channel driver 120 without rewriting or modifying the CCD 404.

Figure 4A:
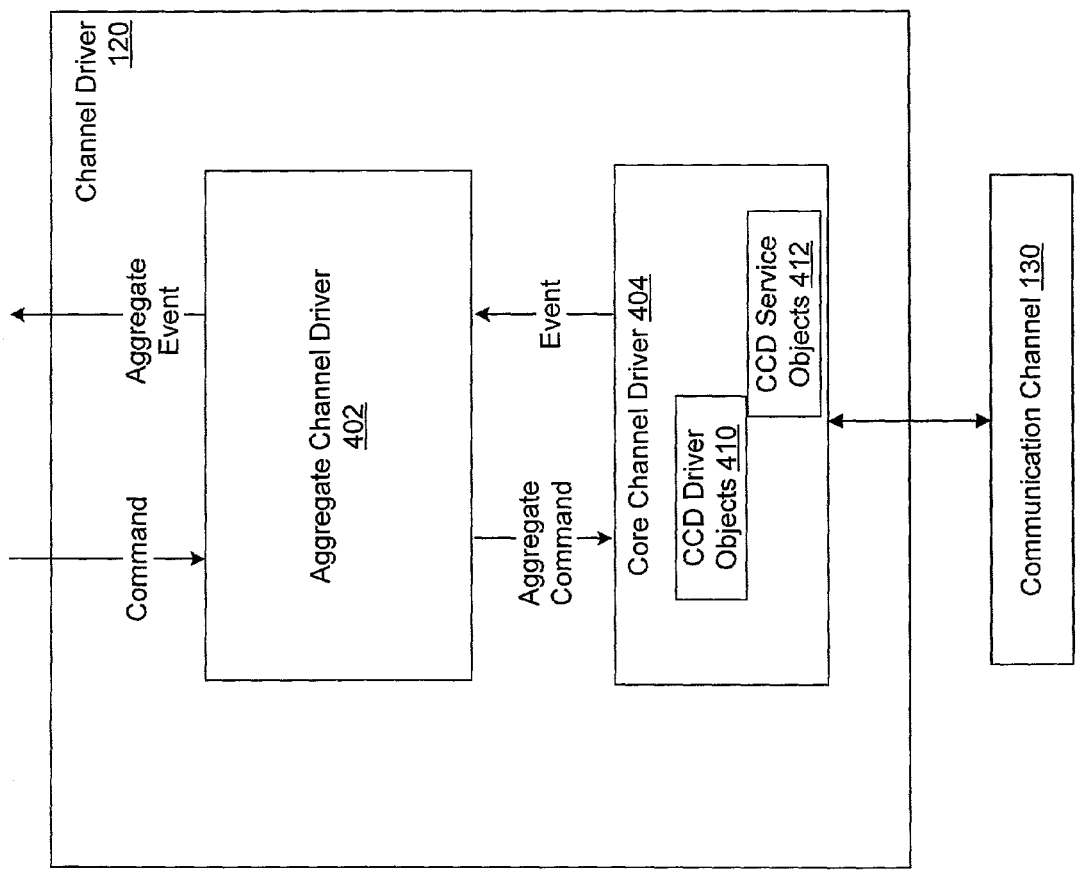
FIG. 4a shows a block diagram of components included in one embodiment of the aggregate channel driver of FIG. 4.

Referring to FIGS. 4 and 4a, FIG. 4a shows one embodiment of the aggregate channel driver (ACD) 402 in accordance with the present invention. The ACD 402 receives an aggregate command from the communication server 109. The ACD 402 can perform one or more functions based on the parameters and command(s) in the aggregate command. In general, the functions performed by the ACD 402 are not supported by the CCD 404. The ACD 402 then generates a command based on the aggregate command that is supported by the CCD 404, and transmits the command to the CCD 404. The ACD 402 thereby allows the user to take advantage of capabilities of the communication server 109 that are not supported by the CCD 404. If the ACD 402 does not recognize a parameter or command, or recognizes a parameter or command as being supported by the CCD 404, the ACD 402 passes the parameter or command to the CCD 404.

The aggregate channel driver (ACD) 402 can also receive an event from the CCD 404, generate an aggregate event, and transmit the aggregate event to the communication server 109. This is useful when the communication server 109 supports more events and event parameters than the CCD 404.

In one embodiment, an interface between the ACD 402, the CCD 404, and the communication server 109 can be established when the communication server 109 invokes the CreateDriverInstance function to create a CCD driver object 410 and the RequestService function to create a CCD service object 412. The identifier for the CCD 412 is transmitted to the communication server 109 via the ACD 402. The ACD 402 intercepts the identifier for the CCD service object 412, and transmits a substitute identifier for the ACD 402 to the communication server 109. The ACD 402 transmits events to and receives commands from the communication server 109 using the substitute identifier for the ACD 402.

The interfaces between the ACD 402, the communication server 109, and the CCD 404 can be released when the communication server 109 invokes the ReleaseDriverInstance ("Aggregated Driver Identifier") and the ReleaseServiceinstance ("Aggregated Driver Identifier") functions. The ACD 402 substitutes the identifier for the ACD 402 with the identifier for the CCD 404 the ReleaseDriverInstance and the ReleaseServiceInstance commands, and transmits the commands to the CCD 404.

The ACD 402 can be implemented in a DLL, and a FreeLibrary("AggregatedDriver") function can be invoked by the channel driver 120 to release the DLL associated with the ACD 402.

Referring to FIGS. 4 and 4b, FIG. 4b shows a flow diagram of an example of logic that can be included in the ACD 402 to extend the functionality of the CCD 404 to handle commands from the communication server 109. When the ACD 402 receives a command, as indicated by process 420, from the communication server 109, the ACD 402 determines whether it recognizes the command in process 422. If so, then the ACD 402 performs one or more options in process 424. The first option includes adding, modifying, or deleting one or more parameters in the arguments of the command. This option can be used, for example, when the CCD 404 supports more command parameters than the communication server 109. This option can also be used to override parameters for temporary changes in the CCD 404 or communication channel 130.

The second option in process 424 includes invoking the ACD 402 or other component in the channel driver 120 to perform functions associated with the command that are not performed in the CCD 404. This allows the customer to extend the functionality of the channel driver 120 without modifying the core channel driver 404.

The third option in process 424 includes invoking the ACD 402 or other component in the channel driver 120 to perform all of the functions associated with the command. When this option is selected, the ACD 130 can be configured to drive the communication channel 130 directly. Alternatively, the CCD 404 can be configured to send drive signals directly from the ACD 130 to the communication channel 130 without attempting to recognize the command, or perform any functions related to the command.

Referring again to process 422, when the ACD 402 does not recognize a command, it can transfer the command directly to the CCD 404 as indicated by process 426. This allows functions to be performed by the CCD 404 with minimal overhead in the ACD 402.

Figure 4C:
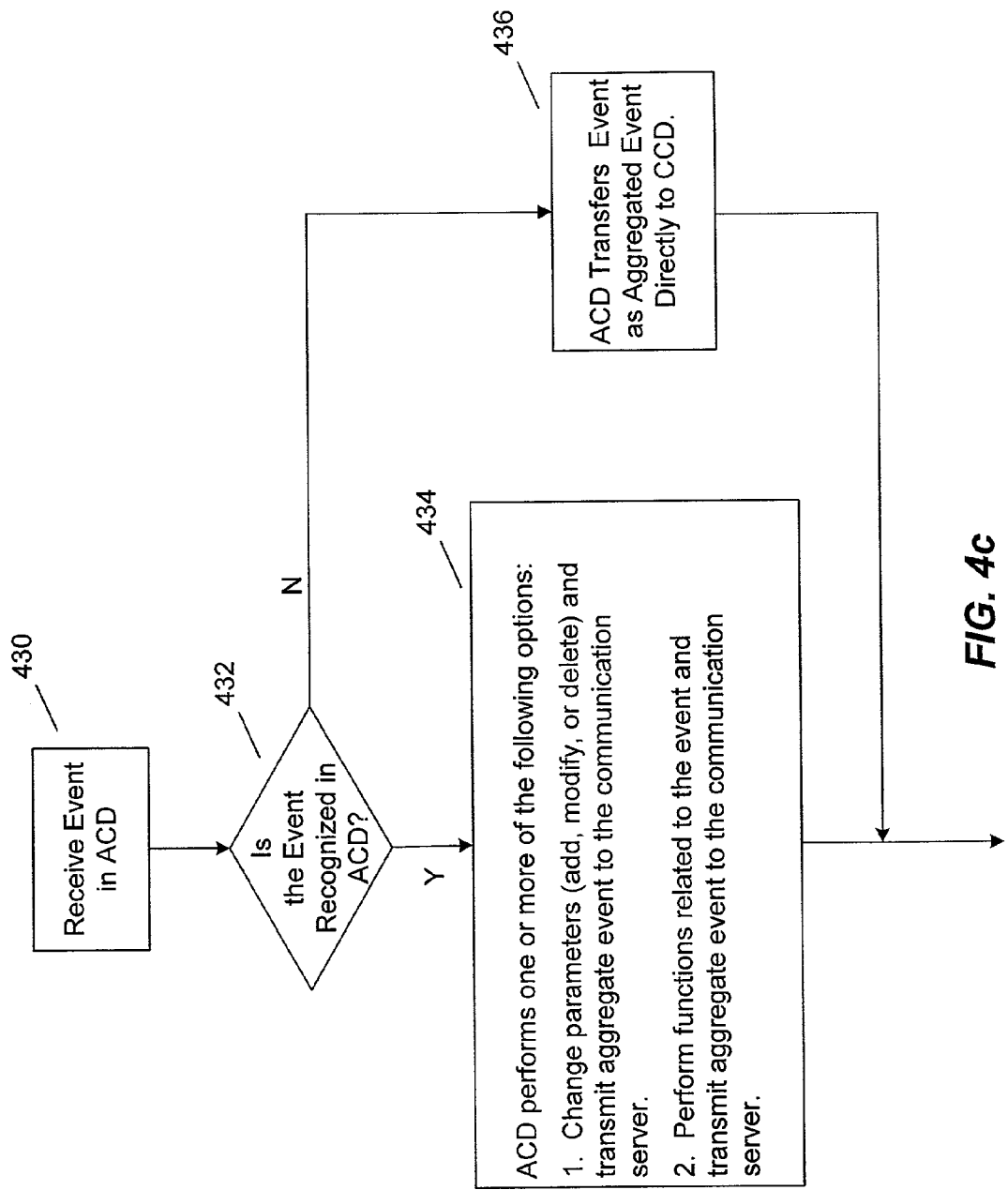
FIG. 4c shows a flow diagram of an example of logic that can be included in the aggregate channel driver to extend the functionality of the core channel driver when issuing events to the communication server.

Referring to FIGS. 4 and 4c, FIG. 4c shows a flow diagram of an example of logic that can be included in the ACD 402 to extend the functionality of the CCD 404 when issuing events to the communication server 109. When the ACD 402 receives a event, as indicated by process 430, the ACD 402 determines whether it recognizes the event in process 432. If so, then the ACD 402 performs one or more options in process 434. The first option includes adding, modifying, or deleting one or more parameters in the arguments of the event. This option can be used, for example, when the communication server 109 supports more command parameters than the CCD 404. This option can also be used to override parameters for temporary changes in the CCD 404 or communication channel 130.

The second option in process 434 includes invoking the ACD 402 or other component in the channel driver 120 to perform functions associated with the event that are not performed in the CCD 404. This allows the customer to extend the functionality of the channel driver 120 without modifying the CCD 404.

Referring again to process 432, when the ACD 402 does not recognize an event, it can transfer the event directly to the CCD 404 as indicated by process 436. Alternatively, the CCD 404 could pass the event directly to the communication server 109 if it can access the client interface information for the communication server 109.

In some embodiments, it is also possible for the ACD 402 to perform a command and send the results directly to the communication server 109 in an event without invoking the CCD 404. In such situations, the ACD 402 interfaces directly with the communication channel 130, as required, or facilities can be provided in the CCD 404 to allow parameters and events that are not recognized in the CCD 404 to pass through to the ACD 402. Additionally, the communications server 109 and the communication channel 130 can include facilities to interface directly with the ACD 402 or the CCD 404. The CCD 404 can utilize a configuration file or parameters provided by the channel driver 120 that includes a command/event map that can be used to determine whether a particular command or event should be sent to the ACD 402 or the CCD 404.

The channel driver 120 as described herein provides many advantages, such as enabling a customer to extend or modify the functionality of an "off-the-shelf" core channel driver 404 without actually modifying the CCD 404. For efficiency, a customer that wishes to create an ACD 402 should have an understanding of the functions and parameters supported in the CCD 404, and overwrite, or extend, only the functions and parameters that are not supported by the CCD 404.

Other Embodiments

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable media such as floppy disks and CD-ROM and transmission media such as digital and analog communication links, as well as media storage and distribution systems developed in the future.

Additionally, the foregoing detailed description has set forth various embodiments of the present invention via the use of block diagrams, flowcharts, and examples. It will be understood by those within the art that each block diagram component, flowchart step, and operation and/or element illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

We claim:

1. A communication channel driver comprising:
   instructions operable to receive a command from a communication server;
   instructions operable to determine whether to extend a function performed by a core communication channel driver of the communication channel driver, wherein the determination is based on the command;
   instructions operable to process the command before transferring the command to the core communication channel driver, wherein
      the instructions operable to process the command comprise
         instructions operable to modify a list of parameters associated with the command before transferring the command to the core communication channel driver;
   instructions operable to transfer the command to the core communication channel driver of the communication channel driver;
   instructions operable to modify one or more parameters associated with the command before transferring the command to the core communication channel driver; and
   instructions operable to transmit a result of a function to the communication server without transferring the command to the core communication channel driver.

2. The communication channel driver of claim 1, further comprising:
   instructions operable to perform one or more extended functions associated with the command before transferring the command to the core communication channel driver.

3. The communication channel driver of claim 1, further comprising:
   instructions operable to perform one or more functions associated with the command; and instructions operable to transmit a result of the functions to the communication server without transferring the command to the core communication channel driver.

4. The communication channel driver of claim 1, further comprising:

instructions operable to modify a list of parameters associated with the command before transferring the command to the core communication channel driver; and instructions operable to perform one or more extended functions associated with the command before transferring the command to the core communication channel driver.

5. The communication channel driver of claim 1, further comprising:

instructions operable to receive an event from the core communication channel driver;

instructions operable to determine, based on the event, whether to modify a list of parameters associated with the event or perform one or more functions associated with the event; and instructions operable to transmit the event to the communication server.

6. A method of driving a communication channel comprising:

receiving an indication of a driver command to be performed;

invoking a communication channel driver;

processing the driver command by determining whether to perform an extended function in the communication channel driver, wherein the determination is based on the command;

invoking a core communication channel driver of the communication channel driver to complete a function associated with the command, comprising modifying a list of parameters associated with the command before transferring the command to the core communication channel driver wherein the processing is performed before the invoking;

modifying one or more parameters associated with the command before invoking the core communication channel driver; and transmitting a result of the extended function to the communication server without invoking the core communication channel driver.

7. The method of claim 6, further comprising:

transmitting a result of the command to the communication server without invoking the core communication channel driver.

8. The method of claim 6, further comprising:

modifying a list of parameters associated with the command before invoking the core communication channel driver; and performing one or more extended functions associated with the command before invoking the core communication channel driver, wherein the extended functions comprise the extended function.

9. The method of claim 6, further comprising:

receiving an event from the core communication channel driver;

determining, based on the event, whether to modify a list of parameters associated with the event or to perform one or more extended functions associated with the event, wherein the extended functions comprise the extended function; and transmitting the event to the communication server.

10. A computer program product, comprising: instructions to implement the method, of claim 6.

11. A data signal in a carrier wave comprising: instructions to implement the method of claim 6.

12. An apparatus for driving a communication channel comprising:

means for receiving an indication of a driver command to be performed;

means for invoking a communication channel driver;

means for processing the driver command in the communication channel driver, wherein the means for processing comprises means for determining whether to perform an extended function, and the means for determination is configured to make a determination as to whether to perform the extended function based on the command;

the means for processing the driver command comprises modifying a list of parameters associated with the command before transferring the command to the core communication channel driver means for invoking a core communication channel driver of the communication channel driver to complete a function associated with the command;

means for modifying one or more parameters associated with the command before invoking the core communication channel driver; and means for transmitting a result of the extended function to the communication server without invoking the core communication channel driver.

13. The apparatus of claim 12, wherein the means for processing the driver command further comprises:

means for modifying a list of parameters associated with the command before invoking the core communication channel driver.

14. The apparatus of claim 12, further comprising:

means for transmitting a result of the command to the communication server without invoking the core communication channel driver.

15. The apparatus of claim 12, further comprising:

means for modifying a list of parameters associated with the command before invoking the core communication channel driver; and means for performing one or more extended functions associated with the command before invoking the core communication channel driver, wherein the extended functions comprise the extended function.

16. The apparatus of claim 12, further comprising:

means for receiving an event from the core communication channel driver;

means for determining, based on the event, whether to modify a list of parameters associated with the event or to perform one or more extended functions associated with the event, wherein the extended functions comprise the extended function; and means for transmitting the event to the communication server.

* * * * *